Jan. 1, 1952 P. J. BRANCHU 2,580,511
RELEASE MECHANISM
Filed July 23, 1947 2 SHEETS—SHEET 1

Inventor:
PAUL JOSEPH BRANCHU

Jan. 1, 1952  P. J. BRANCHU  2,580,511
RELEASE MECHANISM
Filed July 23, 1947  2 SHEETS—SHEET 2
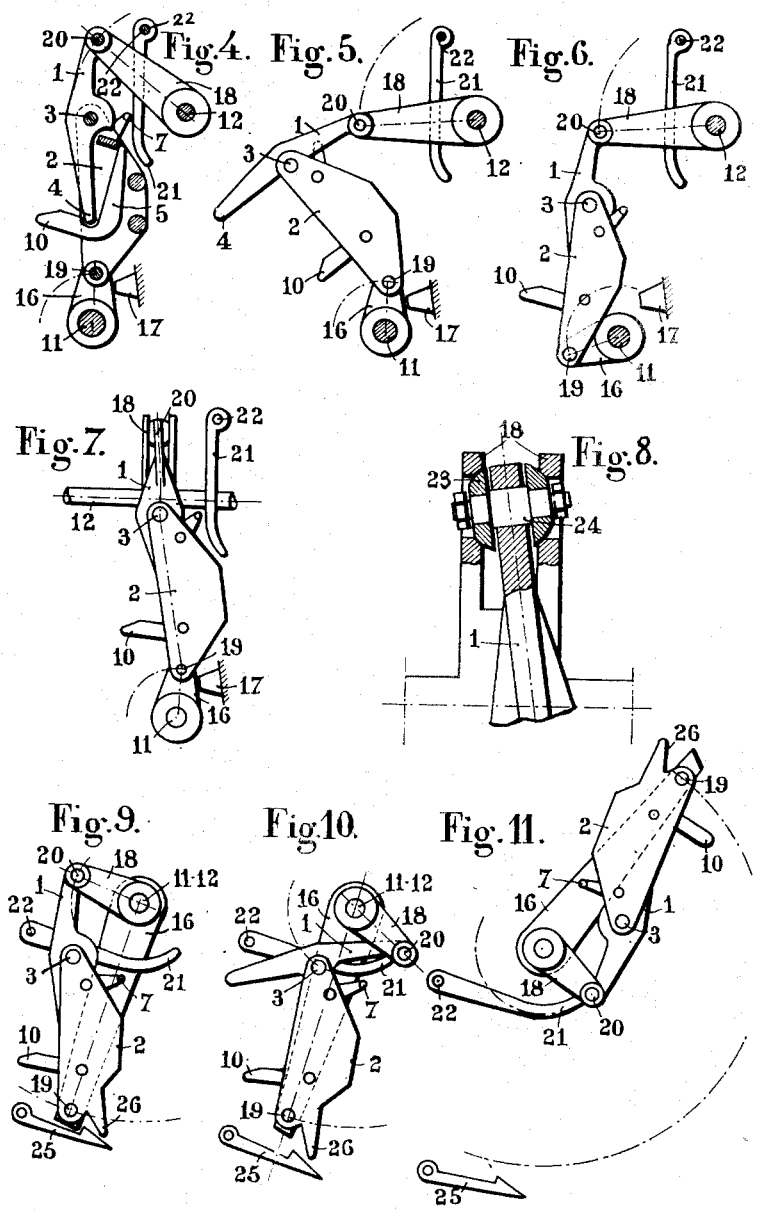
Inventor:
PAUL JOSEPH BRANCHU Patented Jan. 1, 1952

2,580,511

UNITED STATES PATENT OFFICE 2,580,511

RELEASE MECHANISM

Paul Joseph Branchu, Paris, France, assignor to Etablissements Merlin & Gerin-Société Anonyme, Grenoble, France Application July 23, 1947, Serial No. 762,908
In France October 12, 1942

Section 1, Public Law 690, August 8, 1946
Patent expires October 12, 1962

10 Claims. (Cl. 74—2)

It is of course, not new to use in electric circuit breakers toggle release mechanisms comprising two toggle levers articulated to each other and connected respectively to the control member and to the movable contact member of the breaker; with the result that, when it is desired to effect the release independently of the action of the control member, in accordance with the method of operation called "with free release," the common pivot of the system is acted upon, which brings about the deflection of the system and the separation of the contacts. With this device, in order to provide an inertia of the movable apparatus sufficiently great to withstand the shocks and vibrations tending to be communicated to the mechanism, it is feasible to locate the common pivot point of the system on the other side of the line joining the extreme articulation points with reference to the direction of movement of the separating toggles so as to constitute an overset toggle. When the resistance to shocks is satisfactory, on the other hand, the force necessary to be exerted on the median point to bring about the release is unavoidably relatively considerable. On the other hand, due to this fact, for a given motive force applied to the toggles, the speed of release will be less than if the resistance to shocks and jars is reduced. Such operative releasing speed remains limited up to the dead centre position, whenever the only motive force applied to the median point is applied from without.

It has therefore been proposed to use toggle mechanisms in which the three axes of articulation involved are disposed at the junction and upon two lines meeting at an angle but where the median point at the junction is situated beyond a straight line joining the extreme points with reference to the direction of movement of crank of the mechanism so as to form an underset toggle which is then maintained locked in a rigid assembly by means of a locking hook. There is thus ensured a convenient locking of the movable assembly and it then is sufficient to deflect the hook so that the release is thereby produced automatically, while obtaining a better disconnecting operation than heretofore. But if between the two members of the toggle mechanism an angle is used corresponding to the most favourable release conditions, the reaction exerted on the hook and, consequently, the force necessary to deflect the latter, is for practical purposes still too strong; therefore we must frequently be content with a compromise solution which is only partially satisfactory.

The present invention has as its object to remedy the drawbacks mentioned and to obtain, by a suitable operating mechanism, on the whole, an initial rigidity of the coupled toggle members, their stability against mechanical vibrations and a rapid and ultra-sensitive release.

According to the invention, the toggle release mechanism comprises a toggle member provided, beyond its articulation point with an extension, having the extremity thereof forming a lip which engages, in closed position of the mechanism, a recess in a bent lever, which is pivotally mounted on a shaft integral with the second toggle member, the main feature of the invention being the provision of a lock effective in closed position to prevent the rotation of the bent lever.

In the device embodying the invention, the tangential component of the reaction exerted on the toggle lock is much less important than its normal component which, by reason of the reduction caused by the use of a force-reducing bent lever, has but a small value, the lock being preferably located at the end of the long arm of the bent lever. This is why the force necessary to overcome this tangential component and effect the displacement of the lock may be reduced to a minimum value. On the other hand, the stability of the movable assembly in the coupled position is ensured by the locking of the toggle mechanism and by dynamic equilibrium of the lock.

Moreover, since the force necessary for effecting release of the lock is only a very small fraction of the reaction exerted on the lock, the angle formed by the two toggle members of the toggle mechanism may be increased in the coupled position, without increasing this force to an appreciable extent, which makes it possible to obtain a free and rapid opening of the contacts operated by the device. However, this angle is, in any case, conditioned by the values of the reactions exerted on the extreme toggle aritculations and caused by the control and contact systems associated with this mechanism; in other words, if these reactions are considerable, the angle will be little accentuated, with the median articulation of the toggle thus located in the vicinity of a straight line joining the extreme axes.

An improvement which could be applied to this device consists in providing that toggle-member which carries the mentioned lip or prolongation, with a cam adapted to free the toggle lock and maintain it free, after the buckling of the toggle has commenced with the object of preventing said lip or prolongation from meeting the locked force-reducing lever prematurely, at the moment when the lip should return to become lodged in the recess of the lever.

The toggle lock may advantageously consist of a spindle milled on the side to present at least one flat surface. It is preferably balanced about its axis and associated with a balanced weight member, with a strong moment of inertia giving a flywheel effect to render it insensitive to shocks and vibrations. It has been recognized by the applicants that in selecting the desired inertia of the assembly formed by the lock and the balance weight, the stability of the mechanism and its security of operation (notably when using the cam), can be substantially increased, practically without interfering with its sensitivity.

The invention relates, also to devices allowing the use of such toggle release mechanisms, adapted for the control of circuit-breakers with free release.

It particularly comprises arrangements making it possible for control shafts and the shaft connected to the movable contacts to form together any angle, or to be coaxial, and having the operating angle fairly wide.

Several other objects and features will appear more fully in the following description with reference to the annexed drawing which shows, solely by way of non-limiting example one method of construction, and in which:

Fig. 4 is a sectional view of a toggle release mechanism used, more or less conventionally, in combination with levers for operating a circuit-breaker with free release.

Figs. 5 and 6 illustrate the same parts in different positions (the toggle-release mechanism being shown in elevation).

Fig. 7 shows a similar device, in which ball joints are used so that the control shaft and the shaft of the circuit-breaker need not be parallel but may even be perpendicular to each other.

Fig. 8 discloses detail of a convenient construction of the ball joint.

Figs. 9, 10 and 11 illustrate in various positions, one device in which the control shaft and the shaft of the circuit-breaker have the same axis, with the angular deviation between the closed and the released position relatively large.

Figure 1:
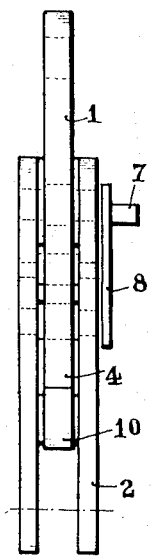
Figs. 1 and 2 are a front elevation and a partial sectional side view of an improved toggle release mechanism in the coupled position.
Figure 2:
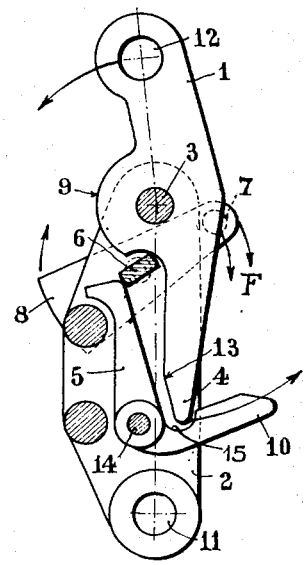
Figure 3:
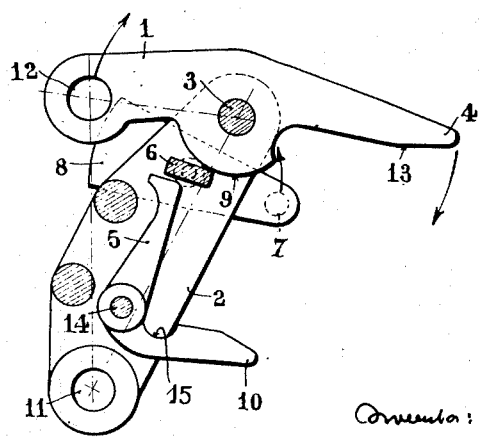
Fig. 3 is a partial sectional side view of the same toggle release mechanism in the deflected or buckled position.

At its two extremities, the toggle-member 1—2 of the Figures 1 to 3 comprises articulation spindles 11 and 12, one of which is integral with the control member and the other integral with the movable contacts of a breaker.

This toggle mechanism primarily includes two toggle members 1 and 2 articulated together at 3. The articulation pivot 3 is located between the two extreme spindles 11 and 12 in a position adjacent to a straight line which passes through these two spindles. In this case, the toggle mechanism works under compression; but a toggle mechanism working under tension could also operate with the articulation 3 at the prolongation of the straight segment 11—12.

Toggle member 1 carries a lip 4 which becomes immobilized in a recess 15 (Fig. 2) in a force-reducing bent lever 5, which in turn is pivoted at 14 on toggle member 2. This recess 15 is preferably adjacent to the articulation pivot 14 of the bent lever 5. This lever is engaged or immobilized in turn at the extremity of one of its arms 27 by a lock 6 movable about the axis of a spindle 28 rotatably mounted on toggle member 2.

The lock 6 forms a portion of the spindle 28 bearing on the two side-pieces of lever 2, said portion having the length enclosed between the side pieces of rectangular shape. The present invention, however, is not limited to such a feature, for obviously, the locking operation may be performed by other equivalent means, as for example by a hook, a bolt or the like.

It would still be possible to immobilise the lever 5 by engaging an arm thereof in a recess provided in a second force-reducing lever also capable of being locked, or it would be possible to interpose a larger number of levers mutually cooperating to become locked while correspondingly reducing the force required to unlock the levers to a great degree.

The lock 6 is preferably centrally balanced about its axis and made integral with a member 8 forming a flywheel. The lock 6 is partially rotated during operation and may be returned by a spring.

To release the mechanism when locked, the lock 6 is caused to pivot by the operator acting for example, on the finger thus swung clockwise upon pivot 11 by release of end 4 of toggle member 1 from recess 15 by release of arm 27 of lever 5 from lock 6. As pivot 3 is out of line with pivots 11 and 12, the toggle will then be released to buckle into the position shown in Fig. 3, because the pressure on the toggle will cause such buckling to occur, inasmuch as in the locked condition, pivot 3 is past center in the buckling direction.

In order to effect the straightening of the toggle mechanism, it is sufficient to cause the pivots or spindles 11 and 12 to separate (or to cause them to mutually approach in a toggle mechanism working under tension). A spring disposed about the pivot 3 can be arranged to act at one end on pivot 11 and at the other end on pivot 12 in such manner as to straighten or restore the mechanism to original position. However, as pivot 14 is mounted on toggle lever 2 which carries pivot 11, one end of the spring could instead be arranged to act on pivot 14, with the same effect. A boss 13 on the toggle lever 1 could be added to return lever 5 into the coupling position, when the toggle mechanism is straightened.

It could possibly occur that in a deflected operated or buckled position of the divided toggle mechanism, the lock 6 might accidentally block arm 27 and thereby immobilise lever 5 so that lip 4 of the toggle member 1 in the course of an attempt at a further straightening, impinges against the extremity in the form of a lip member 10, and is thus prevented from reaching its place in the recess. In order to remedy this drawback, the member 10 may be extended in such manner as to form a ramp in constant contact with the lip 4 and, in this manner to avoid the locking of the lever 5.

But in certain cases, as in that shown in Fig. 3, it would be necessary in this latter arrangement, to have the ramp of inadmissible size if it be desired that it shall remain in constant contact with, and not leave, the lip 4. Thus a shorter ramp has to suffice, such as shown at 10, while avoiding all risk of locking by acting directly on the lock 6 by means of a cam 9 carried by toggle lever 1. In Figs. 2 and 3, the cam 9 is supported against one of the flat sides of the lock 6 as soon as a certain yielding angle of the toggle mechanism is attained and in any case before the lip 4 has left the ramp 10.

In the improved form shown in Figs. 4 to 6, a lever 16 is mounted on the spindle 11 and its travel is limited by a stop 17. Another lever 18 is mounted on the spindle 12 connected to the movable contacts of the circuit-breaker (not shown). Fig. 4 represents the whole of the controlling mechanism in closed or locked position.

The toggle is articulated at 19 and 20 at the ends of the two levers 16 and 18 and includes the two toggle members, 1 and 2, linked together by pivot 3 and initially maintained rigidly in locked position by the very sensitive system, described hereinabove; for unlatching this system and buckling the toggle. It suffices for an operator to act on the finger 7 through a tripping lever 21 mounted on a tripping shaft 22. This lever 21 is bent at its extremity so as to follow the displacement of the finger 7, during a part of the closing travel of the circuit-breaker.

Fig. 5 illustrates the same mechanism as in Fig. 4, but the release has been performed by the deflection or buckling of the toggle, without return of the operating handle (not shown) which acts on the spindle 11.

In Fig. 6, the handle has been turned backwards and the whole of the mechanism is ready for a new closure.

Fig. 7 illustrates an improvement in the preceding mechanism; the two extremities of the toggle release mechanism are articulated on the levers 16 and 18 by means of ball-joints, allowing a certain angular deviation between the toggle and the levers. By this arrangement, the shaft 12 of the circuit-breaker and the shaft 11 of the operating handle or operating lever can be directed so as to form together a certain angle; and they can even be perpendicular to each other. The use of bevel gears or other costly transmission members can thus be avoided without any alteration of the operation of the toggle release mechanisms.

Fig. 8 discloses one form of construction of said ball joints allowing the use of a normal toggle release mechanism, such as shown in Fig. 4. Each ball-joint comprises circular planoconvex plates 23, fixed by means of screws on a cylindrical stud 24, and freely pivoting in the articulation seats 30 of the member 1. The ball joint, so constituted, is held between the two branches of the forked lever 18. It is thus seen that the main rotary movement occurs directly about shaft 24 by pivoting of member 1 in normal conditions, while the movement of the ball joint only takes place for compensating the slight obliquities due to the angle formed by the main shafts. This form is an advantage, as the friction of the cylindrical shaft 24 is obviously much less than that occurring between the ball joint and its housing and the normal operation of the toggle release mechanism is consequently not impeded.

Figs. 9 to 11 illustrate the toggle release mechanism of a circuit-breaker in which the control shaft 11 and the shaft connected to the movable contacts of the circuit-breaker are coaxial. In order to provide a great angular travel for the operation of the circuit-breaker, levers 16 and 18 are of different lengths and their difference is at least equal to the minimum length of the toggle mechanism in operated or buckled position in order to allow lever 18 to pass beyond lever 16. In closed or locked position (Fig. 9) lever 16 preferably integral with an operating handle is normally held by the latch 25, while the toggle mechanism, pivotally mounted about pivots 19 and 20 in turn holds lever 18 connected to the movable contacts. When the toggle-mechanism is buckled or deflected, it turns about articulation pivot 3 and lever 18, now free, bypasses lever 16 and reaches the position shown in Fig. 10. At the end of the travel, the heel 26 of the toggle mechanism lifts latch 25 and lever 16, which now in turn is freed, and can be brought into the position of Fig. 11, when the toggle is thus set up and ready for a new closure.

Manifestly, the invention should not be arbitrarily limited to the sole examples described and shown, all modifications being applicable thereto, substantially in accordance with the case and applications, conforming to the general spirit of the present invention. Thus it is that the toggle mechanism could be utilized to maintain in position any member other than the movable assembly of a circuit-breaker. For example, when articulated at one of its extremities to a fixed point, it could serve to sustain a heavy body or to immobilize a member urged by operating forces, while at the same time effecting the release of these members when they are brought into deflected or buckled position.

Having now particularly described and ascertained the nature of my said invention, and in what manner the same is to be performed, I declare that what I claim is:

1. A toggle joint movable between extended and collapsed positions and a releasable lock mechanism therefor comprising, in combination, first and second elongated toggle members pivotally connected to each other for mutual turning about a first axis transverse to said toggle members; an elongated lever pivotally connected to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; lock means mounted on one of said toggle members and engaging said elongated lever for opposing turning thereof by said elongated projecting portion so that said toggle joint is thereby maintained in its extended position; and actuating means connected to said lock means for moving the same into and out of engagement with said elongated lever, whereby, when said actuating means moves said lock means out of engagement with said elongated lever, said projecting portion turns said elongated lever about said second axis and said toggle members simultaneously buckle toward the collapsed position of the toggle joint.

2. A toggle joint movable between extended and collapsed positions and a releasable lock mechanism therefor comprising, in combination, first and second elongated toggle members pivotally connected to each other for mutual turning about a first axis transverse to said toggle members; an elongated lever pivotally connected at an intermediate part thereof to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; an elongated bar pivotally connected to said first toggle member for turning about a third axis substantially parallel to said first axis, said bar having a rectangular section located adjacent to said elongated lever on the same side thereof as said projecting portion and on the opposite side of the pivotal connection of said lever from said lever portions of different widths, a narrow side of said rectangular bar section engaging said lever and opposing turning thereof by said elongated projecting portion so that said toggle joint is thereby maintained in its extended position; and actuating means connected to said elongated bar for turning the narrow side of said rectangular bar section into and out of engagement with said elongated lever, whereby, when said actuating means moves said narrow side of said rectangular bar section out of engagement with said elongated lever, said projecting portion turns said elongated lever about said second axis and said toggle members simultaneously buckle toward the collapsed position of the toggle joint.

3. A toggle joint movable between extended and collapsed positions and a releasable lock mechanism therefor comprising, in combination, first and second elongated toggle members pivotally connected to each other for mutual turning about a first axis transverse to said toggle members; an elongated lever pivotally connected at an intermediate part thereof to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; an elongated bar pivotally connected to said first toggle member for turning about a third axis substantially parallel to said first axis, said bar having a rectangular section located adjacent to said elongated lever on the same side thereof as said projecting portion and on the opposite side of the pivotal connection of said lever from said lever portions of different widths, a narrow side of said rectangular bar section engaging said lever and opposing turning thereof by said elongated projecting portion so that said toggle joint is thereby maintained in its extended position; and crank means connected to said elongated bar for turning the narrow side of said rectangular bar section into and out of engagement with said elongated lever, whereby, when said crank means moves said narrow side of said rectangular bar section out of engagement with said elongated lever, said projecting portion turns said elongated lever about said second axis and said toggle members simultaneously buckle toward the collapsed position of the toggle joint.

4. A toggle joint movable between extended and collapsed positions and a releasable lock mechanism therefor comprising, in combination, first and second elongated toggle members pivotally connected to each other for mutual turning about a first axis transverse to said toggle members; an elongated lever pivotally connected at an intermediate part thereof to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; an elongated bar pivotally connected to said first toggle member for turning about a third axis substantially parallel to said first axis, said bar having a rectangular section located adjacent to said elongated lever on the same side thereof as said projecting portion and on the opposite side of the pivotal connection of said lever from said lever portions of different widths, a narrow side of said rectangular bar section engaging said lever and opposing turning thereof by said elongated projecting portion so that said toggle joint is thereby maintained in its extended position; actuating means connected to said elongated bar for turning the narrow side of said rectangular bar section into and out of engagement with said elongated lever, whereby, when said actuating means moves said narrow side of said rectangular bar section out of engagement with said elongated lever, said projecting portion turns said elongated lever about said second axis and said toggle members simultaneously buckle toward the collapsed position of the toggle joint; and cam means connected to said second toggle member and engaging a long side of the rectangular bar section during movement of the toggle joint towards its collapsed position so as to thereby maintain said narrow side of said rectangular bar section out of engagement with said elongated lever.

5. A toggle joint movable between extended and collapsed positions and a releasable lock mechanism therefor comprising, in combination, first and second elongated toggle members pivotally connected to each other for mutual turning about a first axis transverse to said toggle members, each toggle member having an end portion located distant from the other toggle member when the toggle joint is in its extended position; a first link member pivotally connected at one end thereof to said end portion of said first toggle member and being pivotally mounted at its other end; a second link member pivotally connected at one end thereof to the end portion of said second toggle member and being connected at the other end thereof to a rotatably mounted member to be controlled by the toggle joint, whereby when the toggle joint is moved between its extended and collapsed positions, said link members are turned and said rotatably mounted member also is turned; an elongated lever pivotally connected to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; lock means mounted on one of said toggle members and engaging said elongated lever for opposing turning thereof by said elongated projecting portion so that said toggle joint is thereby maintained in its extended position; and actuating means connected to said lock means for moving the same into and out of engagement with said elongated lever, whereby, when said actuating means moves said lock means out of engagement with said elongated lever, said projecting portion turns said elongated lever about said second axis and said toggle members simultaneously buckle toward the collapsed position of the toggle joint.

6. A toggle joint movable between extended and collapsed positions and a releasable lock mechanism therefor comprising, in combination, first and second elongated toggle members pivotally connected to each other for mutual turning about a first axis transverse to said toggle members, each toggle member having an end portion located distant from the other toggle member when the toggle joint is in its extended position; a first link member pivotally connected at one end thereof to said end portion of said first toggle member and being pivotally mounted at its other end; a second link member pivotally connected at one end thereof to the end portion of said second toggle member and being connected at the other end thereof to a rotatably mounted member to be controlled by the toggle joint, whereby when the toggle joint is moved between its extended and collapsed positions, said link members are turned and said rotatably mounted member also is turned; an elongated lever pivotally connected to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; lock means mounted on one of said toggle members and engaging said elongated lever for opposing turning thereof by said elongated projecting portion so that said toggle joint is thereby maintained in its extended position; and actuating means connected to said lock means for moving the same into and out of engagement with said elongated lever, whereby, when said actuating means moves said lock means out of engagement with said elongated lever, said projecting portion turns said elongated lever about said second axis and said toggle members simultaneously buckle toward the collapsed position of the toggle joint; fixedly mounted stop means located adjacent to said first link member for engaging the same and limiting the turning movement thereof when the toggle joint is moved into its extended position so as to thereby stop the movement of the toggle joint when it reaches its extended position.

7. A toggle joint movable between extended and collapsed positions and a releasable lock mechanism therefor comprising, in combination, first and second elongated toggle members pivotally connected to each other for mutual turning about a first axis transverse to said toggle members, each toggle member having an end portion located distant from the other toggle member when the toggle joint is in its extended position; a first link member pivotally mounted at one end thereof; first ball-joint means located at the other end of said first link member and at said end portion of said first toggle member for pivotally interconnecting said first link member and said first toggle member; a second link member connected at one end thereof to a rotatably mounted member to be controlled by the toggle joint; and second ball-joint means located at the other end of said second link member and at said end portion of said second toggle member for pivotally interconnecting said second link member and said second toggle member, whereby said rotatably mounted member is turned when the toggle joint moves between its extended and collapsed positions; an elongated lever pivotally connected to said first toggle member for turning about a second axis substantially parallel to said first axis, said lever having two immediately adjacent portions of substantially different widths forming a shoulder therebetween, said lever portions being located on the same side of the pivotal connection of said lever and the lever portion of lesser width being located nearer to the pivotal connection of the lever than the lever portion of greater width; an elongated projecting portion connected to said second toggle member and having an end located opposite to said lever portion of lesser width and abutting against said shoulder when the toggle joint is in its extended position so as to tend to turn said elongated lever about said second axis; lock means mounted on one of said toggle members and engaging said elongated lever for opposing turning thereof by said elongated projecting portion so that said toggle joint is thereby maintained in its extended position; and actuating means connected to said lock means for moving the same into and out of engagement with said elongated lever, whereby when said actuating means moves said lock means out of engagement with said elongated lever, said projecting portion turns said elongated lever about said second axis and said toggle members simultaneously buckle toward the collapsed position of the toggle joint.

8. A toggle joint arrangement in which the toggle joint is movable between extended and collapsed positions comprising, in combination, first and second toggle members pivotally connected together for mutual turning about a first axis transverse to said toggle members, each of said toggle members having an end portion located distant from the other toggle member when the toggle joint is in its extended position, and said end portions of said toggle members each being formed with a circular opening passing therethrough; a pair of substantially cylindrical shafts mounted respectively in said openings in the end portions of said toggle members so that said toggle members may each pivot with respect to said shafts; two pairs of ball-joint members having spherical outer surfaces located respectively at each end portion of said toggle members, the pair of ball-joint members at each end portion of said toggle member being located on opposite sides of said toggle members about the openings thereof and being connected to the shafts extending through said openings in the toggle members; and a pair of link members each formed at one end thereof with a ball-joint seat located about one of said pairs of ball-joint members at said end portions of said toggle members and slidingly engaging the same, whereby said toggle members may pivot about said shaft without moving the ball-joint members in the ball-joint seats of said link members and whereby said ball-joint members are slidingly moved in said ball-joint seats of said link members only when said link members are moved about an axis perpendicular to said first axis.

9. A toggle joint movable between extended and collapsed positions and a releasable lock mechanism therefor comprising, in combination, first and second elongated toggle members pivotally connected to each other for mutual turning about a first axis transverse to said toggle members; a substantially L-shaped lever having first and second legs and being pivotally connected adjacent to the junction of its legs to said first toggle member for turning about a second axis substantially parallel to said first axis, said first leg of said L-shaped lever being formed with a recess therein on the inner side thereof and adjacent to the pivotal connection of said L-shaped lever; an elongated projecting portion formed integrally with said second toggle member and having an end located in said recess of said first leg of said L-shaped member when the toggle joint is in its extended position, the said end of said projecting portion abutting against the side of said recess which is adjacent to the outer end of said first leg of said L-shaped lever so as to tend to turn the same about said second axis; an elongated bar rotatably mounted in said first toggle member for turning movement about an axis substantially parallel to said first axis, said bar having a rectangular section located adjacent to the outer end portion of the second leg of said L-shaped lever, and a narrow side of said rectangular bar section abutting against the inner side of said second leg of said L-shaped lever adjacent the outer end thereof so as to thereby oppose turning of said L-shaped lever by said projecting portion and in this way to maintain the toggle joint in its extended position; a crank connected to an outer end of said elongated bar for turning the same, whereby, when said crank causes said narrow side of said rectangular bar section to be moved away from the inner side of said second leg of said L-shaped lever, said end of said projecting portion turns said L-shaped lever about said second axis and said toggle joint simultaneously buckles toward its collapsed position; and a circular cam formed integrally with said second toggle member and having said first axis as its center, said circular cam being located adjacent to said rectangular bar section and engaging a long side thereof as the toggle joint moves towards its collapsed position so as to thereby maintain the narrow side of said rectangular bar section out of engagement with said second leg of said L-shaped lever while the toggle joint is in its collapsed position.

10. A toggle joint arrangement in which the toggle joint is movable between extended and collapsed positions comprising, in combination, first and second toggle members pivotally connected together for mutual turning about a first axis transverse to said toggle members, each of said toggle members having an end portion located distant from the other toggle member when the toggle joint is in its extended position; a first link member pivotally connected at one end thereof to said end portion of said first toggle member and being pivotally mounted at its other end for turning about a second axis; a second link member pivotally connected at one end thereof to said end portion of said second toggle member and being pivotally mounted at its other end for turning about said second axis, said second link member being shorter than said first link member and the difference in length between said first and second link members being at least equal to the minimum length of the toggle joint as it moves between its extended and collapsed positions; pivotally mounted latch means engaging said one end of said first link member so as to prevent the turning thereof about said second axis; and a projecting portion connected to said first toggle member and having an end located adjacent to said latch means when said toggle joint is in its extended position and engaging said latch means when said toggle joint moves from its extended position toward its collapsed position, whereby the latch member is moved away from said one of said first link member by said projecting portion during the movement of said toggle joint toward its collapsed position so as to thereby release said first link member and permit it to turn about said second axis.

PAUL JOSEPH BRANCHU.

REFERENCES CITED

The following references are of record in the file of this patent:

UNITED STATES PATENTS

| Number | Name | Date |
|---|---|---|
| 441,260 | Tyberg | Nov. 25, 1890 |
| 777,295 | Marx | Dec. 13, 1904 |
| 1,041,975 | Dennis | Oct. 22, 1912 |
| 2,218,606 | Foster | Oct. 22, 1940 |
| 2,313,197 | Hammand | Mar. 9, 1943 |
| 2,426,039 | McKune | Aug. 19, 1947 |

FOREIGN PATENTS

| Number | Country | Date |
|---|---|---|
| 530,469 | France | Dec. 23, 1921 |
| 502,721 | Germany | July 16, 1930 |